United States Patent [19]
Hunnicutt et al.

[11] 3,711,963
[45] Jan. 23, 1973

[54] APPARATUS FOR PROGRAMMED INSTRUCTION AND TESTING

[75] Inventors: Jack B. Hunnicutt, George W. Plumly, both of Fort Worth, Tex. 76116; Troy R. Radford, Fort Worth, Tex. 76135

[73] Assignee: Mycom Corp., Fort Worth, Tex.

[22] Filed: Dec. 6, 1971

[21] Appl. No.: 204,829

[52] U.S. Cl. ................................................35/9 A
[51] Int. Cl. ..............................................G09b 7/08
[58] Field of Search.........................................35/9 A

[56] References Cited

UNITED STATES PATENTS

| | | | |
|---|---|---|---|
| 1,749,226 | 3/1930 | Pressey | 35/9 A X |
| 2,564,089 | 8/1951 | Williams et al. | 35/9 A |
| 2,877,568 | 3/1959 | Besnard et al. | 35/9 A |
| 2,965,975 | 12/1960 | Briggs | 35/9 A |
| 3,577,657 | 4/1971 | Plumly et al. | 35/9 A |
| 3,605,286 | 9/1971 | Plumly | 35/9 A |
| 3,605,289 | 9/1971 | Plumly et al. | 35/9 A |

*Primary Examiner*—Wm. H. Grieb
*Attorney*—Wm. T. Wofford et al.

[57] ABSTRACT

An improved programable system for effecting automated teaching for use in conjunction with the problem and answer material wherein a plurality of answers are provided for each problem arranged in accordance with a predeterminable program, including encoding means, apprising means, display means for problem and correct answers, and advancing means having a movable bolt; characterized by a bolt moving means that incorporates features that require the student to be irrevocably committed before actuating the system and that cannot be cheated by the student; and incorporating improved, lightweight pawls as gear engaging means carried by the bolt in conjunction with a gear reduction means between the bolt and the program means such that some of the stringent demands on the mass, acceleration and deceleration, and the angle and time of travel of the bolt are lessened. Also disclosed are specific preferred structural embodiments, including a structure that enables the armature of a low current solenoid to effect, reliably, impact engagement of the lightweight pawls.

28 Claims, 11 Drawing Figures

PATENTED JAN 23 1973

INVENTORS:
Jack B. Hunnicutt
George W. Plumly
Troy R. Radford
BY
Wofford, Felsman & Fails
ATTORNEYS

PATENTED JAN 23 1973

INVENTORS:
Jack B. Hunnicutt
George W. Plumly
Troy R. Radford
BY
Wofford, Feloman & Fails
ATTORNEYS 3,711,963

APPARATUS FOR PROGRAMMED INSTRUCTION AND TESTING

BACKGROUND OF THE INVENTION

1. Field of the Invention

This invention relates to programed instruction or question-and-answer games. More particularly, this invention relates to programed instruction where it is desirable to afford both teaching, and testing and grading as necessary.

2. Description of the Prior Art

The prior art is replete with devices for testing of students. Several of the prior art approaches are described in the following U.S. Pats. Nos.:

3,577,657 entitled "Apparatus for Programed Instruction and Testing," issued to George W. Plumly, Jack B. Hunnicutt and Charles R. Deyo on May 4, 1971;

3,605,286 entitled "Method and Apparatus for Programed Instruction and Testing," issued to George W. Plumly on Sept. 20, 1971; and 3,065,289 entitled "Method and Apparatus Incorporating Electronic Components for Programed Instruction and Testing," issued to George W. Plumly and Jack B. Hunnicutt on Sept. 20, 1971.

The methods and apparatus described in these patents obviated the disadvantages of the prior art methods and devices and provided programed instruction that was widely flexible in the modes and the number of problem-correct answer sequences, yet was economical and easily employed by the students in the classroom without modification of the classroom. It was found, however, that the apparatus in these systems was not totally satisfactory, for two primary reasons. First, the system design imposed stringent demands upon the mass, acceleration and deceleration, degree of movement and elapsed time of movement of a bolt in the apparatus described therein. In particular, the mass of the problem and correct answer gear engaging means carried by the bolt did not allow sufficient freedom in design of the means for decelerating the respective elements, including the bolt; yet operate the bolt and the program means through only a few degrees to advance to the next problem. Attempts to solve the problem by demounting the solenoid means introduced problems of having too high a current drain such that the battery of the system was drained too quickly. Other attempts created a system that could theoretically be cheated by the student.

Thus, the prior art did not provide a fully cheat-proof system and at the same time provide a lightweight gear engaging means that could be operated into position to engage respectively the problem and the problem and correct answer gears without an unduly large current drain and without imposing stringent demands upon acceleration and deceleration apparatus for the bolt.

DESCRIPTION OF PREFERRED EMBODIMENTS

In addition to providing the objects set forth in the aforementioned U.S. Pats. Nos. 3,577,657; 3,605,286; and 3,605,289, it is also an object of this invention to obviate the disadvantages of the prior art devices for programed instruction or question-and-answer games and alleviate the stringent engineering demands upon the acceleration and deceleration apparatus for the bolt, the problem display means, and the program means.

It is also an object of this invention to obviate the disadvantages of the prior art structure and satisfy the foregoing object, yet provide a fully cheat-proof system that does not require an impractically large amount of current for its operation.

These and further objects will become apparent from the following descriptive matter when taken in conjunction with the drawings.

The outline of steps and specific flow charts indicating operation of the invention in various modes is described in the hereinbefore referenced patents; such as, U.S. Pat. No. 3,577,657, referred to hereinafter simply by its number. Therein, the specific operation in either the tutor mode; the test and grade mode; or the tutor, test and grade mode was described. That descriptive matter is embodied herein by reference for affording a complete understanding of the detailed operation of this invention. The following condensed descriptive matter is believed sufficient to avoid having to refer to the aforementioned patents for an understanding of this invention.

Figures 1, 3, 4:
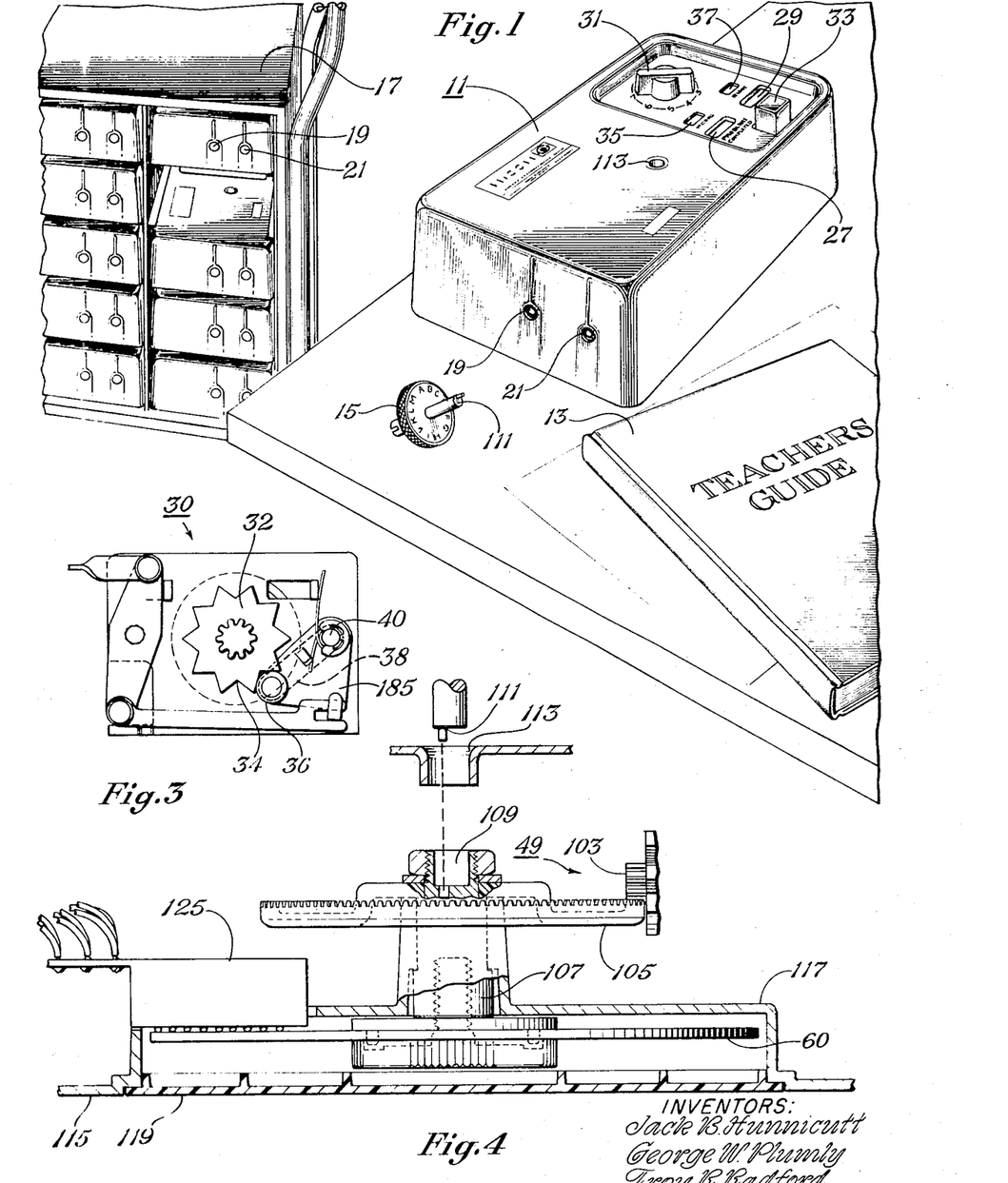
FIG. 1 is a perspective view of one embodiment of this invention.
FIG. 3 is a partial side elevational view illustrating a stop for stopping and centering a display means in accordance with an embodiment of this invention.
FIG. 4 is a partial side elevational view illustrating a gear reduction means that is disposed intermediate the bolt and the program means in the embodiment of FIG. 2.

Referring to FIG. 1, the programable system, or teaching device, 11 is a transistorized, electromechanical instrument, about the size of a textbook. This handy size makes it convenient for the student to use the instrument at his desk or almost any other working area. It does not require exterior electrical connections and no classroom modification is necessary for each student to have an individual machine. A teacher's guide 13 is provided to be used in conjunction with the programable system 11. The teacher's guide 13 contains random answer patterns to be used in preparing materials for use with the programable system 11. The teacher can develop objective materials in any subject area and in any language, for use with the programable system 11, in accordance with programs delineated in the teacher's guide 13. A typical programing matrix is delineated in U.S. Pat. No. 3,577,657. This flexibility is possible because the electronic logic and memory systems in the programable system 11 monitor correct answer patterns instead of specific programed material. The teacher's guide 13 furnishes a complete selection of a large number of randomized answer patterns to aid the instructor in preparing individual tests. A spearable setting means, or separable teacher's key, 15 is provided for two purposes. The teacher uses this key 15 to set the programable system 11 for the mode of operation and to select the desired random answer pattern. The teacher also uses the key to reset the programable system 11, as for the next class, and clear the digital read-outs on the problem display means and the correct answer display means of the programable system 11. The teacher's key 15 is available only to the teacher and is designed so that the code settings are removed with the separable and the student cannot alter the digital counters, or know and memorize the problem-correct answer program, or otherwise cheat the programable system 11. Also illustrated is a mobile storage cabinet 17 facilitating rapid transportation of a module containing a plurality of the programable systems 11 for use in different classrooms where tests or programed instruction is being given the students. The cabinet 17 provides space for storing enough units for an average sized classroom. The programable systems 11 are stored in the cabinet 17 with their apertures 19 and 21 exposed to the front of the machine so that the teacher may remain seated and program all of the machines with the separable teacher's key 15 in a matter of one or two minutes. The programing is done, as described in U.S. Pat. No. 3,577,657, by insertion of the teacher's key 15 into the respective apertures 19 and 21 and dialing in the code of the multideck wafer switches 23 and 25, FIG. 2, for the predetermined program selected from the teacher's guide 13; the code being shown by letters on the teacher's key 15.

A conventional method of preparing tests and instructional materials may be employed directly for use with the programable system 11, so the teacher does not have to alter his technique or learn a new procedure. The only new procedure necessary for adapting the present materials or new materials to the programable system 11 is the selection and use of an answer pattern, with the desired mode of operation, form the teacher's guide 13. The large number of random answer patterns eliminates the possibility of establishing a fixed pattern that allows the student to guess answers. As described in U.S. Pat. No. 3,577,657, the conventional test paper up to eight and one-half inches wide can slide under the exterior cabinet of the programable system 11 to conserve space on the top of the desk or the like. There is no connection between the paper and the machine. In fact, it is not even necessary to use printed test materials, since questions can be given to the student by oral or by visual presentation, in accordance with a predetermined program, the program being known only by the teacher.

Thus, after the teacher has prepared the material to be given to the student and programed the programable system 11 by use of the separable teacher's key, the programable system 11 is given to the student for further instructional activity. For example, the student may be given a test. The number of the problem will be indicated to the student by the number on the problem number display means, or problem display means, 27 visible through its window. The number of correct answers that the student will have obtained at any point is indicated on the correct answer number display means, or correct answer display means, 29 visible through its window. The student selects his choice of answer for the indicated problem by positioning the correct answer selector lever 31 of the answer selector means, to an appropriate indicator such as a number or letter. As illustrated, the answer positions are indicated by numbers. If desired, the answer choices can be indicated by letters arranged alphabetically to correspond to the numbers such that tests may employ either number or letter designation of answer choices. In any event, the answer selector lever 31 is turned to the selected answer. At the bottom of the panel is an activator button, or push button, 33. After turning the answer selector lever 31 to the selected response, the student depresses the activator button 33. This action registers the response to the question in the following manner. First, one of the indicator lights 35 or 37, serving as apprising means, will flash. If the correct response has been chosen, the green light, when it is employed as the correct answer apprising means, will flash. If an incorrect response has been chosen, the red light, when it has been chosen as the incorrect apprising means, will flash. Second, digital counters, serving as the respective problem and correct answer display means, will be advanced in accordance with the mode of operation for which the programable system 11 is programed and the correctness of the response.

Figures 2, 9:
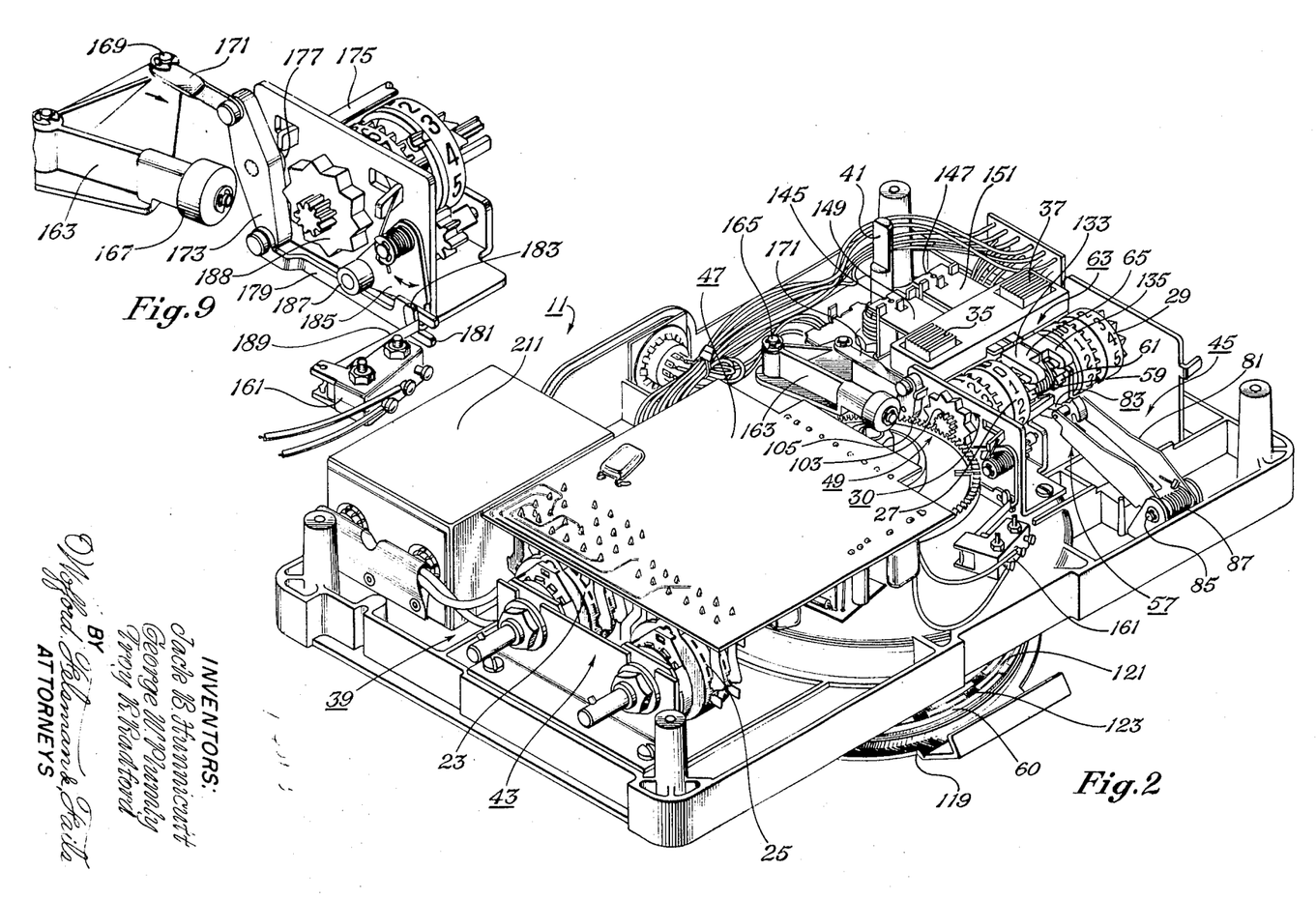
FIG. 2 is an isometric view of the embodiment of FIG. 1 with the outer case, or cover, removed.
FIG. 9 is a partial isometric view showing pulsing means and the resetting means in accordance with an embodiment of this invention.

Referring to FIG. 2, the illustrated programable system 11, with its cover removed, has encoding means 39 that includes the separable setting means; such as the separable teacher's key 15, FIG. 1; an answer selector means of which the answer selector lever shaft 41 is illustrated, the answer selector lever 31 having been removed with the outer cover; and a programing network 43 including the two multideck wafer switches 23 and 25. As described in detail in U.S. Pat. No. 3,577,657, the encoding means includes the answer selector means for selecting an answer to a given problem and a programable network that can be readily programed to select one of many problem-correct answer sequences; and define whether an answer selected and registered on the answer selector means for a given problem is correct or incorrect. As illustrated, the programing network 43 also selects the number of answers for each problem and selects a mode of operation. Simpler systems may not employ the latter options. Programable system 11 includes advancing means 45 that is selectively operable for advancing either the problem number display means 27 alone, or both the problem number display means 27 and the correct answer display means 29. As illustrated, the advancing means may, in a tutor mode of operation, advance neither the problem number display means 27 nor the correct answer display means 29. The educator may not require the tutor mode and it can be omitted if desired, but it is a useful mode of teaching that affords positive and negative reinforcement without the negative psychological effects of grading.

The respective problem and correct answer display means 27 and 29 comprise conventional digital counters counting from zero to 100, inclusive. On the earlier models the display means were disposed peripherally of a disc such that they were stopped, as was the bolt, within about 3°. In this invention, the respective display means have a centering assembly 30, FIGS. 2 and 3. The centering assembly 30 comprises a lightweight flywheel 32 having ten valleys, or detents. A centering cylinder 36 is biased toward the flywheel 32 by a biased arm 38 that is pivotally mounted on shaft 40. Thus, the respective display means may be operated through an angle of about 30° instead of about 3°. Moreover, because of the inwardly biased centering cylinder 36, the respective display means may have their respective masses and stops adjusted to an optimum independently of the bolt or any program means that may be connected therewith. Expressed otherwise, the respective display means are forced rapidly to a new and centered position once the centering cylinder 36 passes over the peak on its way to the next valley 34. As in a conventional counter, the digits wheel will activate the tens wheel at the appropriate point. We have selected a tens wheel that will register to 10 so that 100 questions may be asked on a given test or instructional material.

The programable system 11 also includes a discriminating means 47 that is connected with the encoding means 39. The discriminating means 47 includes a first means for generating an appropriate signal, for advancing both problem and correct answer display means 27 and 29, upon selection of a correct answer the first time an answer is given to a problem; and a second means for generating an appropriate second signal, for advancing only the problem display means 27, after an incorrect answer is given on the first try. The respective first and second means are illustrated in only a general way by the electrical interconnections in FIG. 2, but are described in detail in connection with the electrical schematic of FIG. 12 of U.S. Pat. No. 3,577,657. The programable system 11 includes an actuator means for actuating at least the discriminating means 47. The actuator means is not visible in FIG. 2, but is illustrated as limit switch 51 in FIGS. 5-7. The details of complete operation started by actuation of the actuator means, such as closing of limit switch 51, is described in U.S. Pat. No. 3,577,657 with respect to microswitch 193 of FIG. 12 therein. The descriptive matter of U.S. Pat. No. 3,577,657 is incorporated by reference herein for affording a complete story of the operation of the programable system 11, as indicated hereinbefore.

This invention is primarily concerned with improvements in the advancing means 45. The advancing means 45 comprises the following elements or subassemblies: bolt means, such as bolt 53, FIG. 5, for effecting the desired operation of the programming system 11, FIG. 2; bolt moving means 57, FIGS. 2 and 5, for moving the bolt; problem gear 59 that is connected with the problem display means 27, and a program means, such as program disc 60, FIG. 1; gear reduction means 49 connected intermediate the problem gear 59 and the program means 60; correct answer gear 61 that is connected with the correct answer display means 29; problem and correct answer gear engaging means 63; and problem gear engaging means 65.

Figure 5:
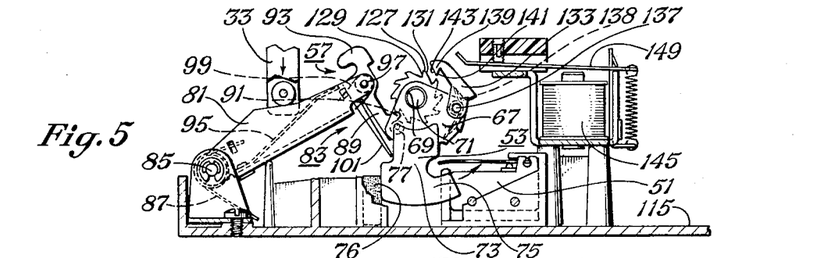
FIG. 5 is a partial schematic side elevational view of a bolt, bolt moving means, and gear engaging means in the starting position, in accordance with one embodiment of this invention.
Figure 6:
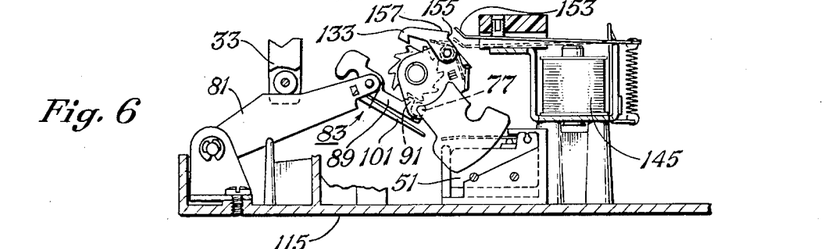
FIG. 6 is a partial schematic side elevational view of the bolt, bolt moving means, and gear engaging means of FIG. 5 as the bolt is moved through the major portion of the arc of movement of the bolt.

The bolt 53 comprises a bolt having dual sides, each of the sides having a side elevational shape as illustrated in FIG. 5. The bolt 53 carries a stub shaft portion 77 for being engaged by a ratchet means of the bolt moving means 57. The bolt 53 includes on respective sides a first portion 67 carrying the respective gear engaging means and having an aperture 69 by which it is pivotally mounted on a shaft 71; and, also, including a second portion 73 that is connected with the first portion 67. The second portion 73 carries a flyweight 75. The flyweight 75 allows effecting, through the resulting inertia and momentum of the bolt 53, a regulating effect to achieve optimum bolt acceleration, such that proper engagement of the pawls and advancement of the respective gears and display means is achieved. A padded stop 76 is provided for stopping the flyweight 75 on bolt 53 as it returns at relatively high speed, the stopping being made independently of the problem and correct answer display means or the problem and correct answer gears such that the mass and inertia of the flyweight 75, and hence, of bolt 53 can be adjusted to an optimum independently of the respective gears and display means.

Figure 8:
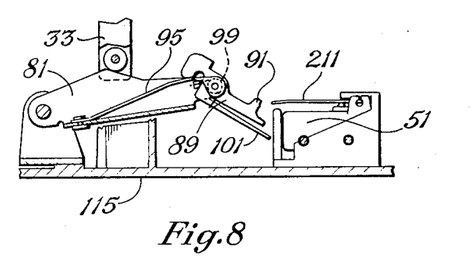
FIG. 8 is an abbreviated partial schematic side elevational view of the embodiment of FIG. 7 illustrating how the bolt moving means is foreshortened to disengage from the actuator means upon a slight relaxation of pressure by the person operating the system.

The bolt moving means comprises a first member, such as push button lever 81, that is responsive to movement of the activator button 33, and a bolt engaging means 83 for engaging and moving the bolt responsive to movement of the first member. The push button lever 81 is mounted for pivotal movement about shaft 85; and is biased toward the starting, or upper, position by spring 87. The push button lever 81 carries at its free end the bolt engaging means 83. Together, the first member 81 and the bolt engaging means 83 define a dimensionchangeable, biased ratchet means that engages the bolt 53 such that the person depressing the activator button 33 is irrevocably committed to an answer before the actuator means is actuated. The ratchet means is biased such that the person cannot manipulate the answer selector means, including the answer selector lever 31 and the activator button 33, and wrongfully obtain credit for a correct answer on a given try. The biased ratchet means is dimensionchangeable such that the bolt moving means cannot on any given try actuate the actuator means a second time without again engaging and moving the bolt 53. Specifically, the bolt engaging means 83 comprises toggle lever 89, FIG. 5, having protruding tooth means, such as tooth 91, for releasably engaging the stub shaft portion 77 of the bolt 53. As illustrated in FIGS. 5-8, the tooth 91 engages the stub shaft portion 77 when moved in one direction; such as, forwardly, or downwardly;

and slips form engagement therewith at the terminal portion of a given try, or stroke. On the other hand, the tooth 91 will ratchet over the stub shaft portion 77 when moved in the opposite direction, or upwardly, so as to engage the stub shaft portion 77 when moved downwardly. A coil spring 99 is provided in the illustrated embodiment to bias the toggle lever toward the bolt 53 such that the tooth 91 will tend to reengage the stub shaft portion 77. The toggle lever 89 and the push button lever 81 form an elongatable and foreshortenable structure. When the structure is elongated, the toggle lever 89 engages a first biasing means so as to bias the structure toward a foreshortened position. Specifically, the first biasing means comprises a leaf spring 95 that is carried by the push button lever 81. The leaf spring 95 engages a portion 93 of the toggle lever 89 on the side of its pivotal connection with shaft 97 opposite tooth 91 before its most elongate, or substantially linear, configuration is reached. By linear configuration is meant a configuration in which the toggle lever 89 and the push button lever 81 form an angle of 180° therebetween. The toggle lever 89 has a second biasing member 101 for biasingly actuating the actuator means, such as limit switch 51, without control by the person depressing the activator button 33, once the tooth 91 slips from engagement with the stub shaft portion 77 of bolt 53. The second biasing member 101 forms a biased extension of the toggle lever 89 that coacts with the leaf spring 95 to keep the limit switch 51 actuated until the push button lever 81 is moved in the reverse direction sufficiently for the leaf spring 95 to effect the requisite foreshortening to disengage the second biasing member 101 from the limit switch 51, as illustrated in FIG. 8. Thus, as will become more clearly apparent from the operational description later hereinafter, a structure is formed whereby the tooth 91 engages the stub shaft portion 77 on the forward movement of the activator button 33 by the person answering the questions; traverses in one direction moving the bolt 53, releases the bolt, and irretrievably actuates limit switch 51. Limit switch 51, in turn, actuates the discrimination means 47 and effects generation of either the appropriate signal or the appropriate second signal for effecting the appropriate operation of the system. The structure is such that the first biasing means effects foreshortening of the structure as soon as the person releases pressure on the activator button 33 such that the limit switch 51 is opened, or disengaged, and cannot be closed, or engaged, again without again engaging the tooth 91 with the stub shaft portion 77 of the bolt 53.

The problem gear 59 is rotatable in both directions about the axis of its shaft. As illustrated, its shaft is the shaft 71 that also supports the bolt 53. The problem gear 59 is connected with the problem number display means 27. As illustrated, it is directly connected with the digits wheel of the counter serving as the problem display means 27. The problem gear 59 is also connected with a program means so as to advance the program means each time the problem gear is advanced.

A gear reduction means 49 is connected intermediate the problem gear and the program means for lessening the stringent requirements on the mass, acceleration and deceleration, and time and distance of operation of the bolt 53 that ultimately drives both the problem gear and the program means. As can be seen in FIGS. 2 and 4, the gear reduction means comprises a small gear 103 that is connected with the problem gear 59 and has peripheral teeth that engage peripheral teeth on a large gear 105. Referring to FIG. 4 for greater clarity, the large gear 105 is connected to shaft 107 which is journalled in a suitable bearing insert and carries program means in the form of the program disc 60. As indicated hereinbefore, the program disc 60 moves through an angle of only about 3°–3.5° in advancing to the next problem of 100 problems. The gear reduction means allows the bolt and the problem display means to move through a much greater angle so engineering tolerances are greatly increased and the stringent requirements are lessened. Specifically, there is more movement of the bolt available for loading a spring so the spring may be more easily designed and installed, the bolt is allowed to move a greater distance within the critical time before it carries the gear engaging means too far. Since the bolt can move farther, it can obtain greater speeds and have a greater momentum for effecting the requisite movement of the problem and correct answer gears and display means.

The shaft 107 carries, at its upper end, a receptacle 109 for receiving the reset end 111 of the separable teacher's key 15, FIG. 1. The reset end 111 is simply inserted through the aperture 113, FIG. 4, and into the receptacle 109. Thereafter, the program disc 60 is rotated back to its initial starting position, as indicated by the 00 number on the counter serving as the problem display means 27. As illustrated in FIG. 4, the cabinet 115 of the programable system 11 has an inwardly extending wall 117 that defines a chamber housing the program disc 60. An access plate, or door, 119 is provided for access to the chamber for the insertion and removal of the program disc 60, as well as to effect the necessary repairs or the like to associated elements.

As described in U.S. Pat. No. 3,577,657, the program disc 60 is a specific illustration of a program means. The program means is connected with the problem gear so as to be advanced each time the problem gear is advanced. The program means has many segments in a first determinable condition and many segments in a second determinable condition. The segments are disposed in a predetermined arrangement on the program means. An interpreting head 125, FIG. 4, is provided to interpret the program means position. It includes a plurality of monitoring means, one each for a predetermined section of the predetermined arrangement. The monitoring means then sense whether a segment in the first determinable condition or a segment in the second determinable condition is contiguous to the respective monitoring means for any given segments of the program means. The program means may comprise any means, such as magnetic tape having segments of magnetically oriented domains, or paper tape having apertures therethrough, or any other suitable program device. Program disc 60, however, illustrates a preferred embodiment for the program means for this invention.

The program disc 60 has been described in detail in U.S. Pat. No. 3,577,657. It is sufficient to note here that, as illustrated by the partial plan view of FIG. 2, the program disc 60 has a plurality of annular tracks, including a common terminal track. The program disc 60 has a plurality of intermediate tracks that contain insulating segments 121 and conducting segments 123. The conducting segments are all connected together and connected with the common terminal track to provide a closed circuit if a correct answer is selected, as described in detail in U.S. Pat. No. 3,577,657, and described briefly hereinbefore and hereinafter.

The interpreting head 125 has, as monitoring means, fingers or brushes, one for each track on the program disc 60 for sensing whether an insulating segment 123 or a conducting segment 125 is under and contiguous the respective brushes. The arrangement of the brushes has been described specifically in U.S. Pat. No. 3,577,657, and need not be described in detail herein. It is sufficient to note that they are disposed generally radially of the program disc 60 along a predetermined radial, or radials.

The correct answer gear 61 is rotatable in both directions about the axis of its shaft and is connected with the correct answer number display means 29.

The problem gear and the correct answer gear have essentially the same structure in which peripherally disposed teeth 127, FIG. 5, extend outwardly. Each respective tooth has an engaging surface 129 that is inclined at an acute angle to the radial of the tooth such that when engaged by a pawl, it will tend to effect further engagement as long as a force is imposed thereacross. Each tooth 127 has a back side, or lifting, surface 131 that tends to lift a pawl from engagement with the tooth if the respective gear overruns the pawl. Expressed otherwise, if the gear overruns the pawl because of the greater velocity imparted to the respective display means because of the centering cylinder 36, FIG. 3, the back side surface 131 will lift the pawl outwardly from the gear and tend to disengage it.

The problem and correct answer gear engaging means 63 is carried on the bolt 53 and is operable to engage a tooth on each of the problem gear 59 and the correct answer gear 61 upon receipt of an appropriate signal and biased to disengage both of the teeth after cessation of the signal. Specifically, the problem and correct answer gear engaging means 63 comprises a pair of lightweight pawls 133 and 135. As illustrated, the pawls 133 and 135 are made of plastic such as Nylon, Orlon, or Delrin. Other lightweight plastics, metals or the like may be employed if desired.

The problem gear engaging means 65 is carried on the bolt 53 and operable to engage a tooth on the problem gear 59 upon receipt of an appropriate second signal and biased to disengage the tooth after cessation of the signal. The problem gear engaging means 65 comprises the pawl 133.

The pawls 133 and 135 are, as indicated, carried by the bolt 53. They are mounted for pivotal movement about respective shafts such as shaft 137, FIG. 5. Each pawl is biased, as by a coil spring 138 disposed about its shaft 137, toward the disengaged position. Each pawl carries at its free end a tooth 139 having an engaging surface 141 and a disengaging cam surface 143. The engaging surface 141 is inclined so as to mate with the engaging surface 129 of the teeth 127 and retain engagement as long as a force is imposed.

Problem and correct answer solenoid means are provided for effecting operation of the problem gear engaging means and the problem and correct answer gear engaging means. Respective solenoid means; such as, problem solenoid 145 and correct answer solenoid 147; are stationarily mounted adjacent the bolt 53 and disposed such that the armature means of each respective solenoid is operable to effect engagement of the respective problem pawl and the correct answer pawl when the respective solenoid is in a first state; such as, being energized to draw the armature downwardly. The respective solenoid allows passage of the bolt and pawl without effecting engagement of the pawl with the respective gear when the respective solenoid is in another state, such as in the deenergized state. The respective armatures and pawls are disposed and shaped such that at the point of impact therebetween when the solenoid means is energized for effecting engagement of the pawl, there is an impact with no upward force imparted to the armature means of the solenoid that would tend to disengage the armature means in opposition to the solenoid. As illustrated, the armatures of the solenoids include laterally extending members 149 and 151, FIGS. 2 and 5-7, having respective free ends that are movable toward the respective pawl for effecting engagement of the pawl. The respective pawls have an external dimension such that they ensure movement of the free ends of the laterally extending members 149 and 151 away from the pawls as the pawls move forwardly with the bolt 53 responsive to movement of the bolt moving means 57. The respective free ends are moved toward the problem and correct answer pawls by the respective problem and correct answer solenoids 145 and 147 upon receipt of the respective appropriate signal or second signal. As illustrated, each free end includes a short portion 153, FIG. 6, that is bent at an angle away from the pawl. The short portion 153 and the coengaging surface 155 on the shoulder 157 of the pawl 133 are so disposed that they impact at an angle such that the impact generates a force tending to force the free end of the pawl downwardly, or toward the respective solenoid, pawl and gear. The exterior shoulder 157 is disposed and dimensioned such that it passes under the free end and bent portion 153 when the pawl is impactly pivoted into engagement with the respective gear; and the exterior shoulder 157 does not force the free end of the laterally extending member away from the pawl as the pawl and its respective engaged gear move toward their respective stop positions. In the illustrated embodiment, the bent portion 153 and the surface 155 are provided such that the free ends of the respective pawls are moved downwardly to effect engagement of the tooth of the pawl with its respective mating gear and the impact of the pawls exterior shoulder 157 on the free end generates a force having a component that acts downwardly on the free end of the laterally extending member of the solenoid.

A pulsing switch means such as limit switch 161, FIGS. 2 and 9, is disposed such that it is closed each time the problem gear is moved one increment. As described in U.S. Pat. No. 3,577,657, the closing of the pulsing switch means effects stopping of the solenoid timing signal and resetting of the memory means. As indicated, the pulsing switch 161 is operatively closed by rotation of the problem gear in either direction. Thus, the memory means is also discharged, or reset, each time the teacher's key is employed to rotate the respective gears, program disc 60 and display means to the starting position for a new class. This prevents inadvertently leaving a memory means charged such that a later using student would be penalized. The linkage effecting this result is illustrated in FIG. 9 in more detail. Referring to FIGS. 2 and 9, a reset member 163 is pivotally mounted for movement about shaft 165 by the insertion of the teacher's key through the aperture 113, FIG. 4. It carries a cylindrical roller 167, FIG. 9, facilitating movement of the free end upon insertion of the teacher's key. A second free end 169 is connected via linkage bar 171 with the master link 173. The master link 173 is fixedly connected with shaft 175 so that rotational movement of the shaft 175 is effected by rotational movement of the master link 173, the shaft 175 being suitably journalled in bearing inserts, such as 177. The master link 173 is also connected with a member 179 having a bifurcated end 181. The bifurcated end 181 engages a tab 183 of the pivotally mounted triangular member 185 carrying a centering cylinder 187 which operates to center the problem display means flywheel 188, just as did the centering cylinder 36 center the flywheel 32 in FIG. 3 of the correct answer display means. As the tab 183 is moved forwardly, it depresses the limit switch arm 189 to effect closure of the pulsing switch 161. Such movement also moves the centering cylinder 187 to allow the flywheel 188 to rotate freely such that the program disc may be readily rotated back to the starting point, rotating the problem display means to 00. Thus, it can be readily seen how the teacher's key effects operation of the pulsing switch 161. In normal sequential advancement to the next problem, the flywheel 188 will force the centering cylinder 187 forwardly, moving the tab 183 on the pivotally mounted triangular member 185, also effecting closure of the pulsing switch 161.

Figure 10:
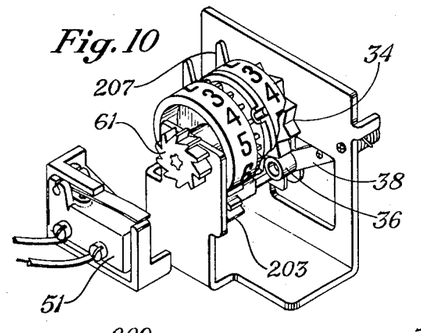
FIG. 10 is a partial isometric view of a subassembly of the embodiment of FIG. 2, containing the correct answer gear, correct answer display means, its stop, and the actuator means.

FIG. 10 is a partial isometric view illustrating the limit switch 51 serving as the actuator means disposed below the location where the bolt 53 is mounted and adjacent the correct answer gear 61. The centering cylinder 36 can be seen in FIG. 10 also.

Figure 11:
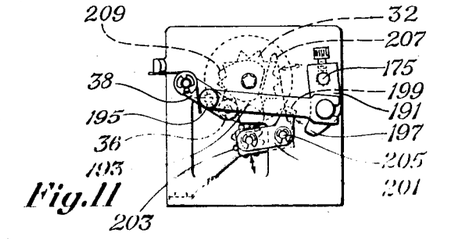
FIG. 11 is a partial end view of the subassembly of FIG. 10 illustrating a linkage for resetting the correct answer display means.

FIG. 11 illustrates the linkage arrangement which facilitates movement of the centering cylinder 36 outwardly to free the correct answer display means for movement back to the starting, or 00, position. The shaft 175, FIGS. 9 and 11, is connected with a zeroing link 191. The zeroing link 191 has its other end connected with bar 193 which engages a stub shaft 195 on the lever 38 carrying the centering cylinder 36 such that the centering cylinder is moved out of engagement with the flywheel 32 and allows free wheeling of the counter wheels and the counter flywheel 32. The lower end 197 of the zeroing link 191 encounters shoulder 199 of the bar 201 carrying the synchronization spider 203. The bar 201 is mounted for pivotal movement with concommitant rotational movement of shaft 205. The shaft 205 is also rigidly connected with a pair of zeroing bars 207. The zeroing bars are disposed such that upon rotation of the shaft 205, the zeroing bars encounter the heart shaped shoulders 209 that return the correct answer display means to the 00 position.

As indicated hereinbefore, the operation of predecessor embodiments of this invention has been described in detail in U.S. Pat. No. 3,577,657, including an explanation of the different modes of operation that can be effected and the unusually large number of programs available through the operation of the program means in combination with the scrambling switches, illustrated as multideck wafer switches 23 and 25. Also described therein are the respective electronic circuits and the like which prevent unnecessary drain on the power source; such as, the battery 211, FIG. 2; as well as schematic flow diagrams of the sequence of events in each of the different modes of operation depending upon whether an answer that is selected is correct or incorrect. Accordingly, that somewhat lengthy and detailed information is not duplicated herein, only the portion pertaining to understanding of this invention being repeated hereinafter.

In operation, the student makes a selection via his answer selector lever 31 and depresses the activator button 33. As the activator button 33 is initially depressed, the tooth 91 engages the stub shaft portion 77 of the bolt 53, as illustrated in FIG. 5. Further depression by the student moves the push button lever 81 and the bolt engaging means 83 downwardly into the position shown in FIG. 6. In this position, the structure of the push button lever 81 and the toggle lever 89 are nearing their most elongate position just prior to disengagement of the tooth 91 from the stub shaft portion 77. Upon further depression of the activator button 33 by the student, the tooth 91 disengages from the stub shaft portion 77, allowing the biased bolt 53 to begin its return, while simultaneously engaging the second biasing member 101 of the toggle lever 89 with the arm 211 of the actuator means, or limit switch 51, FIG. 7. Closure of the limit switch 51 must be very rapid and must effect operation of a sequence of electronic events for proper operation of the programable system 11. In proper operation, the respective problem and correct answer solenoids 145 and 147 effect movement of their respective ends and bent portions 153 downwardly if they are to effect impact engagement of the respective pawl or pawls 133 and 135 with the respective problem and correct answer gears 59 and 61 before the pawls have returned with the accelerating and returning bolt 53 too far for their teeth 139 on their free ends to engage teeth 127 on the respective gears. While the use of the gear reduction means 49 has decreased somewhat, the stringent engineering demands made upon the coaction of the bolt 53 and the respective gear engaging means, allowing many degrees of rotational movement instead of only about 3.5°, the demands are still severe.

It is sufficient to note that the particular sequence of events effected by the discrimination means, as described in U.S. Pat. No. 3,577,657, are contingent upon the correctness or incorrectness of the response and the mode of operation selected. Briefly, the closing of the limit switch 51 activates a lamp timing circuit and an engagement means timing circuit, called the solenoid timing circuit. Through the programing network, the correctness or incorrectness of the answer is sensed. Through the mode selector switch and the programing network 43, the mode of operation will have been chosen. If the tutor mode has been selected the tutor route is afforded by the programing network. If the answer is correct, a green lamp is energized by the lamp timing circuit and remains lighted for a timed interval, the length of which is predetermined by the lamp timing circuit.

The timed interval should be long enough for the light to be detected by the human eye but short enough to prevent unnecessary drain on the power source; for example, about 120 milliseconds.

Simultaneously, the problem gear is advanced and the student is ready for the next problem. Specifically, the appropriate signal is sent to energize the problem solenoid, drawing the free end of the laterally extending member 149 downwardly and impacting the free end of the problem pawl 133 into engagement with the tooth on the problem gear 59. Thus, the mass and momentum of the accelerating bolt means coact with the impact engagement of the pawl 133 to effect movement of the problem gear 59 and, consequently, the program disc 60 and the problem number display means 27. Advancement of the problem gear closes the pulsing switch 161, thereby resetting the solenoid timing circuit, turning off the solenoid and stopping the correct answer signal supplied to a terminal.

If a student's answer is incorrect the student is given a timed red light and nothing more. Accordingly, the student selects and registers a second answer to the same problem. If incorrect, he gets a red light and nothing more. He repeats this process until he has selected the correct answer and is thus forced to learn the correct answer. No score is kept in the tutor mode.

Figure 7:
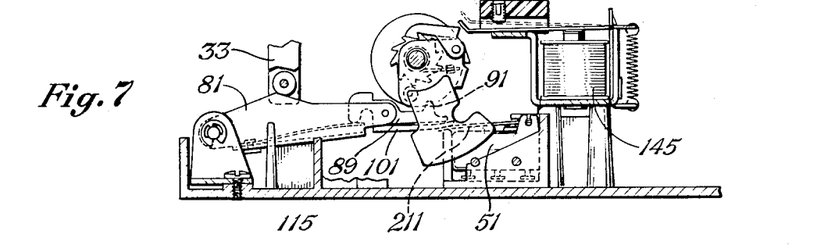
FIG. 7 is a partial schematic side elevational view of the embodiment of FIG. 6 after the actuator means has been actuated to effect operation of the system, including engaging the gear engaging means.

If the test and grade mode has been selected, the proper route and circuits are effected via the programing network 43. The student is given a timed green light if his answer is correct and both the problem and correct answer gears are advanced by the process described hereinbefore. Specifically, the problem solenoid 145 and the correct answer solenoid 147 are energized by the appropriate signal and both of the free ends of the laterally extending members 149 and 151 are drawn downwardly, as illustrated in FIG. 7, to effect impact engagement of the free end of the problem and correct answer gear engaging means 63, or pawls 133 and 135, with both the problem and correct answer gears 59 and 61. Again, advancement of the problem gear 59 also advances the program disc 60 and the problem display means 27. Similarly, advancing of the correct answer gear advances the correct answer display means 29. As described hereinbefore, advancing of the problem gear 59 closes pulsing switch 161 and resets the solenoid timing circuit, with the attendant turning off of the solenoid and stopping of the correct answer signal.

If the student's answer is incorrect, he is given a timed red light. The problem gear 59 is advanced and the student is ready for the next problem. Advancing the problem gear 59 effects all of the results noted hereinbefore. In the test and grade mode, the student is advanced to the next problem whether or not his answer is correct.

If the tutor, test and grade mode has been selected, the programing network 43 effects the proper route. If the student's first selected answer is correct, he is given a timed green light and both the problem gear and the correct answer gear are advanced, with all that connotes, as described hereinbefore. One other action effected by advancing the problem gear is significant in the tutor, test and grade mode. Advancing the problem gear also closes the pulsing switch means 161, thereby deactivating a memory means; for example, by discharging a memory capacitor.

If the student's answer is incorrect he is given a timed red light. In addition, an open switch effected by his first incorrect answer activates a memory means; such as, charging the memory capacitor; such that he will not receive credit for any subsequent correct answer on the same problem. The exact arrangement effecting these results have been described in U.S. Pat. No. 3,577,657 and need not be repeated herein. The student, however, is given no further indication so he should try again. If again an incorrect answer is chosen, the student is given a timed red light, but no further indication and the memory capacitor remains charged. When finally the student selects a correct answer, he is given a timed green light but the charged memory capacitor will prevent the engagement of the problem and correct answer gear engaging means. Consequently, only the problem solenoid is energized to engage only the problem gear engaging means, or pawl 133, to advance only the problem gear 59. When the problem gear 59 is advanced, the other concomitant actions delineated hereinbefore are also effected. As indicated hereinbefore, advancing the problem gear is significant in the tutor, test and grade mode, since it advances the program disc and closes the pulsing switch 161, thereby deactivating the memory means. Accordingly, the student is ready to select and register an answer for the next problem.

Thus, it can be seen that a variety of decisions are made by the programing network, the encoding means, the discriminating means and associated elements and subassemblies before the engagement of the respective gear engaging means is effected by either the appropriate signal or second signal.

The student will answer all the problems throughout the material given. At the end of a test or instructional program, he returns the machine with or without the material to the teacher. The number of correct answers will be displayed if a mode is chosen such that grading is done by the programable system 11, so both the teacher and the student are apprised immediately of the grade the student has made on the test. After the grade is recorded, the teacher resets the machine with her separable teacher's key and places it in the cabinet for the next class. As indicated hereinbefore, resetting the gear and display means to the starting position also effects closure of the pulsing means to ensure that the next student is not penalized by any prior incorrect answer.

It is significant to note herein that, if the student attempts to cheat, as by jiggling the activator button 33 in combination with movement of the answer selector lever 31, the apparatus effects disengagement of the second biasing member 101 from the arm 211 of the limit switch 51, as illustrated in FIG. 8. This disengagement is caused by the foreshortening of the structure comprising the push button lever 81 and the toggle lever 89 by the biasing means, including the leaf spring 95. It can be seen that the second biasing member 101 cannot be reengaged with the arm 211 of limit switch 51, since the respective biasing means such as the leaf spring 95 and the coil spring 99 tend to bias the toggle lever 89 into normal position at slightly more than 90° with respect to the push button lever 81, not into the linear position. On the other hand, the coil spring 99 biases the toggle lever toward the normal position such that tooth 91 can ratchet past the stub shaft of the bolt 53 and engage it on another downstroke, after it has reached the top, or starting position. A consideration of the FIGS. 5-8 will also show that if the student changes his mind before the tooth 91 slips from the stub shaft portion 77, the bolt is returned to rest without energizing the actuator means so no action is taken at all. On the other hand, once the student moves the activator button 33 downwardly far enough to disengage the tooth 91, the biasing action effects the remainder of the operation, including closure of the limit switch 51 and energizing of the electronic means in the programable system 11, without control by the student.

Another significant feature of the invention is that the pawls may engage the teeth on their respective free ends so as to pull the gears around responsive to the momentum of the returning bolt and the respectively and separately optimized elements may be brought to a stop independently of each other. Firstly, the accelerating bolt 53 may be stopped by its resilient stop 76. Secondly, a separate biasing means is provided individually for each of the respective display means that are connected with respective gears such that the biasing means independently stop the display means. Specifically, as the display means are moved such that the peak on their respective flywheels move past the respective centering cylinders, the centering cylinders rapidly move the flywheels to center their next detent, speeding up the display means such that they outrun the respective pawls. Consequently, the camming surface 143 disengages the pawls. Thirdly, the pawls are normally biased toward a disengaged position such that they remain disengaged once their teeth are free of any force tending to retain them in engagement with teeth 127 on their respective gears. Thus, there is a slight free wheeling motion imparted to the gears by the action of the biasing means on the flywheels of the respective counters, serving as the display means.

Also, since the pawls may be engaged and still clear the free ends of the laterally extending members of the respective solenoids, a small solenoid operating on very low current can be employed to reliably effect engagement of the respective pawls without requiring large solenoids that draw unduly large amounts of current. Large solenoids operated in the conventional manner are less reliable.

On any given subsequent try, as the bolt 53 is moved forwardly by the bolt moving means 57 and the respective pawls 133 and 135 move upwardly, the exterior shoulders 57 of the pawls in the disengaged position force the free ends of the respective laterally extending members 149 and 151 outwardly to the position of the deenergized solenoids. This action, ensuring the nonengaging position of the free ends of the laterally extending members 149 and 151 has been found to be advisible to prevent their being retained in their downward position by any residual magnetism of the respective solenoid. Thus, correct operation is always ensured.

The use of auxiliary power sources to replace or augment the battery has been described in the aforementioned U.S. Pat. No. 3,577,657. Such sources can be used in this invention also, if desired.

From the foregoing descriptive matter, it can be seen that this invention achieves all of the objects delineated hereinbefore. Specifically, it provides an economical programable system that has wide flexibility and may be used in teaching any subject matter, but is economical and readily used by a class of students without modification of the classroom; that has so many combinations that it is virtually impossible for the student to learn the machine instead of the material; that provides instantaneous grading for the benefit of both the teacher and the student; that, by engineering advancements, alleviates the stringent demands on the elements and subassemblies and increases the engineering tolerances for greater reliability in operation. Specifically, the bolt moving means in combination with the portion of the answer selector means is provided wherein the student must make an irrevocable committment before the limit switch operating the programable system 11 is operated; wherein once the student is committed and the microswitch has operated, the mechanism forms a foreshortenable structure such that jiggling of the push button and the answer selector lever by the student will not effect operation of the limit switch again and will not thereafter reengage the actuator arm until the bolt moving means is recycled; and wherein if the activator button is withdrawn before the limit switch is operated, the tip of the second biasing member will not strike the actuator arm of the limit switch preventing operation of the system. The invention also provides a mechanism such that once the student is committed, as by disengagement of the tooth 91 with stub shaft portion 77 of the bolt 53, the limit switch will operate a sufficient time so as to effect engagement of the gear engaging means before the bolt arrives at the critical position past which the armature levers, or laterally extending members 147 and 149, can effect engagement of the respective pawls. Expressed otherwise, the mechanism provides a time interval sufficient to enable the electronic circuits to operate and the solenoids of the respective solenoid means to be energized and the armature levers positioned before the pawls have moved too far toward their stop position.

Although this invention has been described with a certain degree of particularity, it is understood that the present disclosure has been made only by way of example and that numerous changes in the details of construction and the combination and arrangement of parts may be resorted to without departing from the spirit and the scope of this

What is claimed is:

1. A programable system effecting automated teaching for use in conjunction with problem and answer material wherein a plurality of answers are provided for each problem comprising:
   a. an encoding means including an answer selector means for selecting an answer to a given problem and a programming network that can be readily programed to:
      i. select one of many problem-correct answer sequences; and
      ii. define whether an answer selected and registered on said answer selector means for a given problem is correct or incorrect;
   b. problem number display means for displaying the number of a given problem;

c. correct answer number display means for displaying the number of correct answers that have been selected and registered;
d. advancing means selectively operable for advancing either said problem number display means alone, or both said problem number display means and said correct answer number display means; said advancing means including:
   i. a bolt means that is rotatable in both directions about a shaft and biased in one direction to a stop position;
   ii. bolt moving means engaging said bolt means in said stop position and operable to advance said bolt means in a direction opposite said one direction for a predetermined distance;
   iii. a problem gear rotatable in both directions about the axis of a shaft and connected with said problem number display means; said problem gear being connected with a program means so as to advance said program means each time said problem gear is advanced, said program means having a plurality of segments in a first determinable condition and a plurality of segments in a second determinable condition disposed in a predetermined arrangement in a plurality of sections thereon, each section having a plurality of segments; said program means having an interpreting head including a plurality of monitoring means, one for each predetermined section of said predetermined arrangement, contiguous one surface for monitoring whether a segment in said first determinable condition or a segment in said second determinable condition is contiguous to each of said monitoring means;
   iv. gear reduction means connected intermediate said problem gear and said program means for lessening the stringent requirements on the mass, acceleration and deceleration, and time and distance of operation of said bolt that ultimately drives both said problem gear and said program means;
   v. a correct answer gear rotatable in both directions about the axis of a shaft and connected with said correct answer number display means;
   vi. problem and correct answer gear engaging means carried on said bolt means and operable to engage a tooth on each of said problem gear and said correct answer gear upon receipt of an appropriate signal and biased to disengage both said teeth after cessation of said signal; and
   vii. problem gear engaging means carried on said bolt means and operable to engage a tooth on said problem gear upon receipt of an appropriate second signal and biased to disengage said tooth after cessation of said second signal;
e. discriminating means connected with said encoding means and including first means for generating said appropriate signal upon selection of a correct answer the first time an answer is given to a problem and second means for generating said appropriate second signal after a first incorrect answer has been selected; and
f. apprising means for showing whether a selected and registered answer of a given problem is correct or incorrect;
g. actuator means for actuating at least said discriminating means;
h. said bolt moving means including:
   i. a first member movable responsive to movement of a portion of said answer selector means by a person selecting an answer; and
   ii. bolt engaging means for engaging and moving said bolt responsive to movement of said first member in one direction;
said bolt engaging means and said first member defining a dimension-changeable, biased ratchet means; said ratchet means engaging said bolt such that said person is irrevocably committed to an answer before said actuator means is actuated; said ratchet means being biased such that said person cannot manipulate said answer selector means and wrongfully obtain credit for a correct answer on a given try; and said biased ratchet means being dimension-changeable such that the bolt moving means cannot on any given try actuate said actuator means a second time without again engaging and moving said bolt.

2. The system of claim 1 wherein said answer selector means comprises a selector lever and a register member referred to herein as a push button, said bolt has a stub shaft portion; said first member comprises a pivotally mounted push button lever; and said bolt engaging means includes a toggle lever pivotally carried at the free end of said push button lever; said toggle lever having a protruding tooth means for releasably engaging said stub shaft portion of said bolt when moved forwardly and opposite said one direction and slipping from engagement therewith at the terminal portion of a given try or stroke; said toggle lever and said push button lever forming an elongatable and foreshortenable structure, said toggle lever engaging a first biasing means so as to bias the structure toward a foreshortened position when it is elongated to effect a dimension change when pressure thereon is relaxed; and said toggle lever having a second biasing member for biasingly actuating said actuator means without control by said person once said tooth means slips from engagement with said stub shaft portion of said bolt; whereby said tooth means engages said stub shaft portion on the forward movement of said register member by said person, traverses in said one direction moving said bolt, releases said bolt, irretrievably actuates said actuator means; the actuator means, in turn, actuating said discriminating means and effecting generation of said appropriate said signal or second signal for effecting the appropriate operation of said system; said first biasing means effecting foreshortening of said structure comprising said push button lever and said toggle lever as soon as said person releases pressure such that said actuator means is disengaged and cannot be engaged again without again engaging said tooth means with said stub shaft portion of said bolt.

3. The system of claim 2 wherein when said tooth means engages said bolt said toggle lever is moved toward a linear configuration with said push button lever as said push button lever is subsequently advanced; said first biasing means comprises a spring carried by said push button lever and engaging a portion of said toggle lever on the side of its pivotal connection opposite said tooth means, the engagement being effected at least before the linear configuration is reached; said second biasing member forms a biased extension of said toggle lever that coacts with said first biasing means to keep said actuator means actuated until said push button lever is moved in the reverse direction sufficiently for said first biasing means to effect the requisite foreshortening to disengage said biased extension from said actuator means.

4. The system of claim 3 wherein said actuator means comprises a limit switch.

5. The system of claim 1 wherein said program means comprises a program disc that is rotatable about an axis and connected with said problem gear so as to be advanced when said problem gear is advanced, said program disc having a plurality of conducting segments and a plurality of insulating segments disposed in a predetermined arrangement on a plurality of sections that consist of concentric circular tracks, said conducting segments each being connected with a common terminal; and an interpreting head including a plurality of brushes, one for each track, is provided for monitoring whether an insulating segment or a conducting segment is contiguous each brush.

6. The system of claim 5 wherein said problem gear, said correct answer gear, said problem number display means, said correct answer number display means and said program disc are rotatable normally in one direction to advance sequentially to the next problem and are rotatable in either direction to be reset to a starting position.

7. The system of claim 5 wherein said program disc has a number of radial rows of segments at least equal to the number of problems with which said system will be employed.

8. The system of claim 5 wherein said problem gear, said correct answer gear, said correct answer number display means, said problem number display means and said program disc are movable to the starting position by a teacher's key means after it has been inserted through an aperture to engage a means connected with a shaft carrying said program disc.

9. The system of claim 1 wherein said encoding means includes separable setting means such that said encoding means may be set to a predetermined program and said separable setting means removed and knowledge of said program denied the user of said programable system.

10. The system of claim 1 wherein there is provided a memory means in said discriminating means to prevent obtaining credit for a correct answer to a given problem if the first answer to that problem is incorrect and wherein there is provided a pulsing means such that said pulsing means will effect deactivation of said memory means, if activated, each time said program means is moved one increment, as by being advanced to the following problem number, and by resetting.

11. The system of claim 10 wherein said pulsing means comprises a limit switch that is disposed such that it is closed each time said problem gear is moved an increment in either direction.

12. The system of claim 10 wherein said advancing means is also selectively operable for advancing neither said problem number display means nor said correct answer number display means in a tutor, test and grade mode; and in a tutor mode.

13. A programable system effecting automated teaching for use in conjunction with problem and answer material wherein a plurality of answers are provided for each problem comprising:
   a. an encoding means including an answer selector means for selecting an answer to a given problem and a programming network that can be readily programed to:
      i. select one of many problem-correct answer sequences; and
      ii. define whether an answer selected and registered on said answer selector means for a given problem is correct or incorrect;
   b. problem number display means for displaying the number of a given problem;
   c. correct answer number display means for displaying the number of correct answers that have been selected and registered;
   d. advancing means selectively operable for advancing either said problem number display means alone, both said problem number display means and said correct answer number display means, said advancing means including:
      i. a bolt means that is rotatable in both directions about a shaft and biased in one direction to a stop position that can also serve as a starting position;
      ii. bolt moving means for moving said bolt responsive to movement of a portion of said answer selector means by a person selecting an answer; said bolt moving means engaging said bolt means in said stop position and operable to advance said bolt means in a direction opposite said one direction for a predetermined distance;
      iii. a problem gear rotatable in both directions about the axis of a shaft and connected with said problem number display means; said problem gear being connected with a program means so as to advance said program means each time said problem gear is advanced, said program means having a plurality of segments in a first determinable condition and a plurality of segments in a second determinable condition disposed in a predetermined arrangement in a plurality of sections thereon, each section having a plurality of segments; said program means having an interpreting head including a plurality of monitoring means, one for each predetermined section of said predetermined arrangement, contiguous one surface for monitoring whether a segment in said first determinable condition or a segment in said second determinable condition is contiguous to each of said monitoring means;
      iv. gear reduction means connected intermediate said problem gear and said program means for lessening the stringent requirements on the mass, acceleration and deceleration, and time and distance of operation of said bolt that ultimately drives both said problem gear and said program means;

v. a correct answer gear rotatable in both directions about the axis of a shaft and connected with said correct answer number display means;

vi. problem and correct answer gear engaging means carried on said bolt means and operable to engage a tooth on each of said problem gear and said correct answer gear upon receipt of an appropriate signal and biased to disengage both said teeth after cessation of said signal; and vii. problem gear engaging means carried on said bolt means and operable to engage a tooth on said problem gear upon receipt of an appropriate second signal and biased to disengage said tooth after cessation of said second signal;

e. discriminating means connected with said encoding means and including first means for generating said appropriate signal upon selection of a correct answer the first time an answer is given to a problem and second means for effecting said appropriate second signal after a first incorrect answer has been selected;

f. apprising means connected with said encoding means for showing whether a selected and registered answer of a given problem is correct or incorrect;

g. actuator means for actuating at least said discriminating means;

h. said problem and correct answer gear engaging means comprising a problem pawl and a correct answer pawl, and said problem gear engaging means comprising a problem pawl; and i. problem and correct answer solenoid means for effecting operation of said problem gear engaging means and said problem and correct answer gear engaging means; said solenoid means being stationarily mounted adjacent said bolt and disposed such that the armature means of each respective solenoid means is operable to effect engagement of the respective problem pawl and correct answer pawl when the respective solenoid means is in a first state and to allow passage thereof without effecting engagement when said respective solenoid means is in another state; said respective armatures and pawls being disposed and shaped such that at the point of impact therebetween when said solenoid means is in said first state for effecting engagement of said pawl, there is no upward force imparted to the armature means of said solenoid means that would tend to disengage said armature means in opposition to said solenoid means.

14. The system of claim 13 wherein said bolt is movable through its maximum angle by said bolt moving means, said bolt moving means incorporating a biasing means and a ratchet means that effect rapid engagement of said actuator means after said bolt is released such that the person answering a question is irrevocably committed before said actuator means is engaged, such that the person cannot cheat by jiggling the answer selector or the like, and such that said actuator means will effect via said discriminating means said appropriate signal or said appropriate second signal via respective said problem solenoid means and said correct answer solenoid means for effecting engagement of said respective problem or correct answer pawls with said problem or problem and correct answer gears before said pawls are carried by said bolt, after release of said bolt, too far toward the stop position to engage their respective gears;

wherein a separate stop is provided for said bolt such that said bolt is stopped independently of said problem and correct answer display means such that its mass and inertia may be adjusted to an optimum independently of said respective display means; and wherein a centering assembly is provided for each said display means such that said respective display means may have their respective masses and stops adjusted to an optimum independently of said bolt and, because of said gear reduction means between said problem gear and said program means, said program means.

15. The system of claim 14 wherein said armatures include laterally extending members having respective free ends that are movable toward said pawls for effecting engagement of said pawls; wherein said pawls have an external dimension such that they ensure movement of said free ends toward a non-engaging position away from said pawls as said pawls move forwardly with said bolt responsive to movement of said bolt moving means; wherein said respective free ends are moved toward said problem and correct answer pawls by respective said problem and correct answer solenoid means upon receipt of the respective said appropriate signal or said appropriate second signal; and wherein said free ends and said pawls have co-engaging surfaces shaped and disposed such that the impact of said arcuately, reversely moving pawls encountering the surface of respective free ends forces the teeth carried at the free end of the pawl to engage the teeth of said respective problem or problem and correct answer gears without generating said upward force on said free end of the laterally extending members.

16. The system of claim 15 wherein each said laterally extending member has a short portion toward its free end that is bent at an angle away from said pawl and the co-engaging surface on said pawl comprises an exterior shoulder so disposed that it strikes the free end of said short portion at an angle such that the impact generates a force tending to force said free end toward said pawl; said exterior shoulder being disposed and dimensioned such that it passes under said free end when said pawl is impactly pivoted into engagement with said respective gear and does not force said free end away from said pawl as said pawl and its respective engaged gear move toward a stop position; and wherein a biasing means is provided for independently centering and stopping said display means connected with said respective gear and said pawls are biased to disengage said respective gears once said pawls are stopped and said respective gears have a slight continued free wheeling motion, said display means and said gears being connected such that a slight free wheeling motion is imparted to said gears by said biasing means centering and stopping said display means; whereby said pawls disengage from said gears when they are respectively brought to rest at their respective stop positions.

17. The system of claim 16 wherein said respective free ends are moved downwardly to effect engagement of said pawls with their respective gears and the impact of each said pawls exterior shoulder with its associated said free end generates a force having a component that acts downwardly on said free end.

18. The system of claim 13 wherein there is provided a memory means in said discriminating means to prevent obtaining credit for a correct answer to a given problem if the first answer to that problem is incorrect and wherein there is provided a pulsing means such that said pulsing means will effect deactivation of said memory means, if activated, each time said program means is moved one increment, as by being advanced to the following problem number and by being reset to the starting position.

19. The system of claim 18 wherein said pulsing means comprises a pulsing switch that is disposed such that it is closed each time said problem gear is moved an increment.

20. The system of claim 18 wherein said advancing means is selectively operable to advance neither said problem answer number display means nor said correct answer number display means in the tutor, test and grade mode; and in the tutor mode.

21. The system of claim 18 wherein said program means comprises a program disc that is rotatable about an axis and connected with said problem gear so as to be advanced when said problem gear is advanced, said program disc having a plurality of conducting segments and a plurality of insulating segments disposed in a predetermined arrangement on a plurality of sections that consist of concentric circular tracks, said conducting segments each being connected with a common terminal; and an interpreting head including a plurality of brushes, one for each track, is provided for monitoring whether an insulating segment or a conducting segment is contiguous to each brush.

22. The system of claim 21 wherein said program disc has a number of radial rows of segments at least equal to the number of problems with which said system will be employed.

23. The system of claim 21 wherein said problem gear, said correct answer gear, said problem number display means, said correct answer number display means and said program disc are rotatable normally in one direction to advance sequentially to the next problem and are rotatable in either direction to be reset to a starting position, as by insertion of a teacher's key means through an aperture to engage a means connected with said program means.

24. The system of claim 13 wherein said bolt moving means includes:
 a first member movable responsive to movement of a portion of the answer selector by a person selecting an answer; and
 bolt engaging means for engaging and moving said bolt responsive to movement of said first member in a forward direction;
 said first member and said bolt engaging means defining a dimension-changeable, biased ratchet means; said ratchet means engaging said bolt such that said person is irrevocably committed to an answer before said actuator means is actuated; said ratchet means being biased such that said person cannot manipulate said answer selector means and wrongfully obtain credit for a correct answer on a given try; and said biased ratchet means being dimension-changeable such that the bolt moving means cannot on any given try actuate said actuator means a second time without again engaging and moving said bolt.

25. The system of claim 24 wherein said answer selector means comprises a selector lever and a register member referred to herein as a push button, said bolt has a stub shaft portion; said first member comprises a pivotally mounted push button lever; and said bolt engaging means includes a toggle lever pivotally carried at the free end of said push button lever; said toggle lever having a protruding tooth means for releasably engaging said stub shaft portion of said bolt when moved forwardly and opposite said one direction and slipping from engagement therewith at the terminal portion of a given try or stroke; said toggle lever and said push button lever forming an elongatable and foreshortenable structure, said toggle lever engaging a first biasing means so as to bias the structure toward a foreshortened position when it is elongated to effect a dimension change when pressure thereon is relaxed; and said toggle lever having a second biasing member for biasingly actuating said actuator means without control by said person once said tooth means slips from engagement with said stub shaft portion of said bolt; whereby said tooth means engages said stub shaft portion on the forward movement of said register member by said person, traverses in said one direction moving said bolt, releases said bolt, irretrievably actuates said actuator means; the actuator means, in turn, actuating said discriminating means and effecting generation of said appropriate said signal or second signal for effecting the appropriate operation of said system; said first biasing means effecting foreshortening of said structure comprising said push button lever and said toggle lever as soon as said person releases pressure such that said actuator means is disengaged and cannot be engaged again without again engaging said tooth means with said stub shaft portion of said bolt.

26. The system of claim 25 wherein when said tooth means engages said bolt said toggle lever is moved toward a linear configuration with said push button lever as said push button lever is subsequently advanced; said first biasing means comprises a spring carried by said push button lever and engaging a portion of said toggle lever on the side of its pivotal connection opposite said tooth means, the engagement being effected at least before the linear configuration is reached; said second biasing member forms a biased extension of said toggle lever that coacts with said first biasing means to keep said actuator means actuated until said push button lever is moved in the reverse direction sufficiently for said first biasing means to effect the requisite foreshortening to disengage said biased extension from said actuator means.

27. The system of claim 26 wherein said actuator means comprises a limit switch.

28. The system of claim 13 wherein said encoding means includes separable setting means such that said encoding means may be set to a predetermined program and said separable setting means removed and knowledge of said program denied the user of said programable system.

* * * * *